Sept. 25, 1934.  A. TEN BOSCH NJZN  1,974,697
FILTER
Filed March 8, 1932   4 Sheets-Sheet 1

A. ten Bosch NJzn
INVENTOR

By: Marks & Clark
Attys.

Sept. 25, 1934.　　A. TEN BOSCH NJZN　　1,974,697
FILTER
Filed March 8, 1932　　4 Sheets-Sheet 2
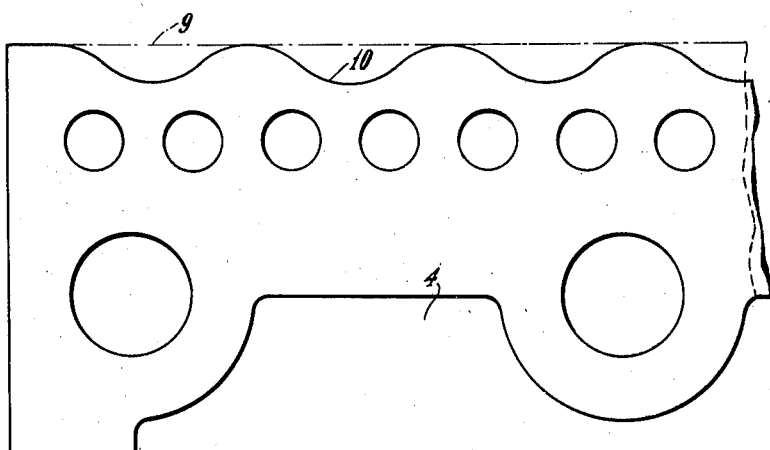
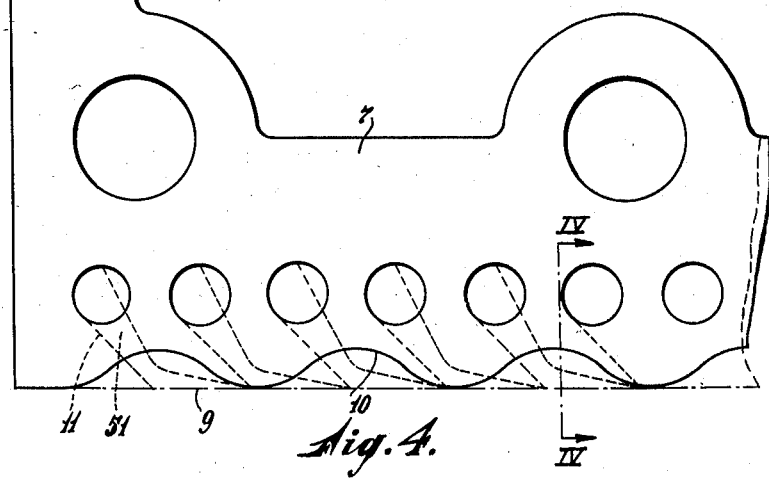
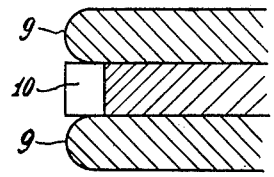
A. ten Bosch NJzn
INVENTOR
By: Marks & Clark
ATTYS.

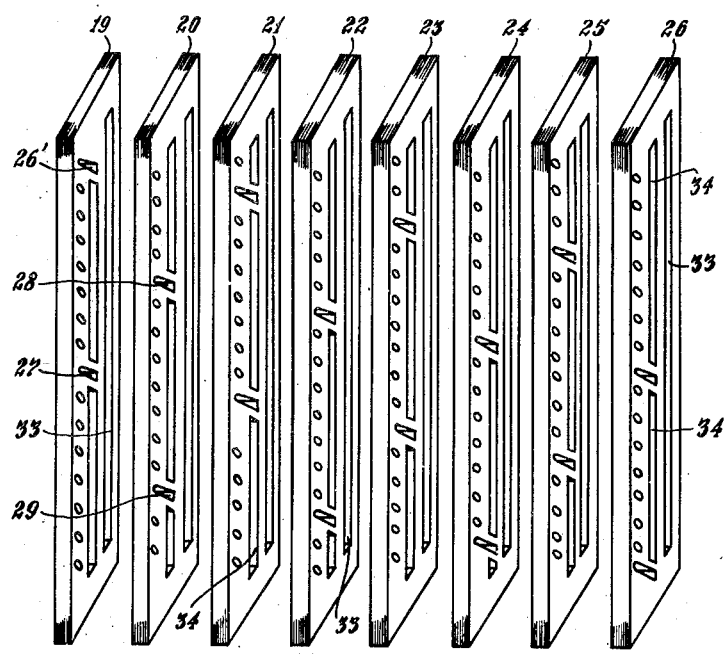
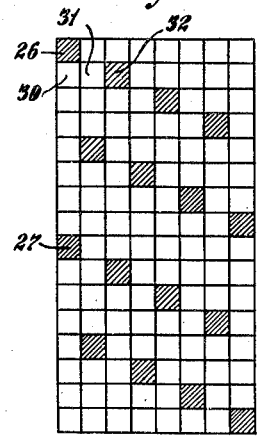

Sept. 25, 1934.    A. TEN BOSCH NJZN    1,974,697
FILTER
Filed March 8, 1932    4 Sheets-Sheet 4
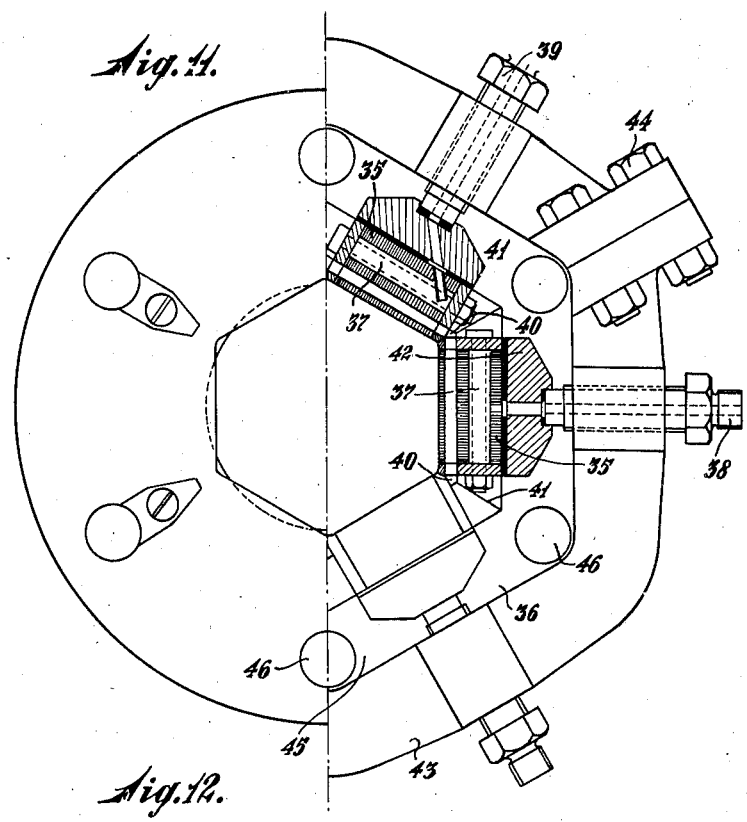
Fig.11.
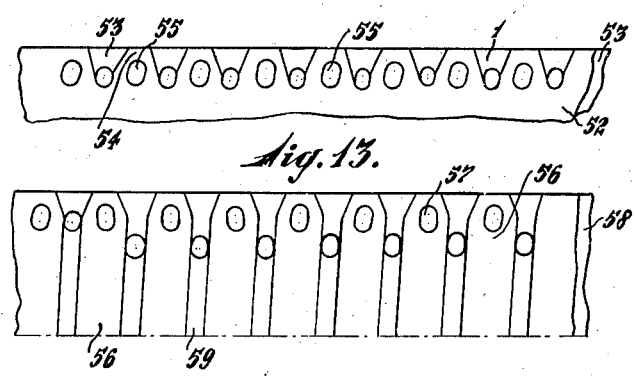
Fig.12.
Fig.13.
A. ten Bosch NJzn
INVENTOR
By: Marks & Clerk
Attys.

Patented Sept. 25, 1934

1,974,697

UNITED STATES PATENT OFFICE 1,974,697

FILTER

Abraham ten Bosch, NJzn, Arnhem, Netherlands, assignor to Naamlooze Vennootschap: Maatschappij tot Exploitatie van "ten Bosch Octroolen N. V.", Arnhem, Netherlands, a corporation of the Netherlands Application March 8, 1932, Serial No. 597,594
In the Netherlands March 17, 1931

4 Claims. (Cl. 100—54)

The invention relates to a filter for reducing the gas or the liquid contents or both of substances, which may contain many capillary spaces, for instance, for the pressing out of water and gases from peat, brown coal, coal mud, clay, chinine, bagasse, etc., of oil from oil seeds, of sugar juice from sugar beets and sugar cane, etc., also for the degasing of coal and brown coal dust, the separation of the whey and the solid substances of milk and blood, the removal of air from dry substances, etc. The filter is also very suitable for use in filterpresses, if desired in continuous operation.

The invention has for its object to so construct the filter that small particles, flowing along from the mass to be pressed out, are automatically removed and at the same time in such a manner, that the section of passage of the filter-area, expressed in percents of the total filter-area, is very large, and that the filter is moreover capable of withstanding a very high pressure and of being heated indirectly.

Moreover the invention has for its object to so construct the filter or the elements of which it is composed, that in a very simple manner the desired filtering capacity may be obtained.

In principle the invention consists in this that the filter comprises a plurality of filter elements lying against each other and united to bodies, said elements having the form of plates, discs, rings, etc., e. g. of steel, iron, bronze or other material, and being each provided for instance at one or more sides or edges with a series of stamped out recesses or incisions starting therefrom, the corresponding recesses of the various filter elements registering so as to form discharge passages extending in the direction of the thickness of the body.

These recesses or incisions in the element may, if desired, be so narrow that when using a filter composed of said elements in a press, the liquid in said spaces stands under the influence of the wall-attraction, so that, if desired, by bringing about a difference in temperature, a fall of the tangential pressure along the wall of the filter-elements and spaces may be created, whereby the liquid will move in the discharge direction.

Filters, thus composed of elements, have the advantage of being adaptable in a simple manner to any desired filtering capacity by altering the number of elements or units.

The drawings illustrate the invention in some examples.

Fig. 3 is a plan view of a filter element of modified construction, placed upon a second filter element, shown in dotted lines.

Fig. 4 is a section on the line IV—IV in Fig. 3.

Fig. 9 is a perspective view of a filter for a vertical press, in which the groups or divisional filters, together forming the filter, have been shown separately in order to bring the structural differences well to the fore. Each group itself consists of filter elements every third one of which is the same.

Fig. 10 is a diagram of the eight groups of Fig. 9 and elucidates the system of passages. The darkened partitions illustrate filter openings which are locally and directly in communication with the discharge, while the other partitions illustrate filter openings that are in communication with the discharge indirectly through branch-passages.

Fig. 11 is, at the left, an end elevation and, at the right, a cross-section of a horizontal filter press built up by means of filters according to the invention.

Fig. 12 is a plan view of another embodiment of a filter-element placed upon an adjacent element.

Fig. 13 is a plan view of a further embodiment of two superposed filter-elements.

Figure 1:
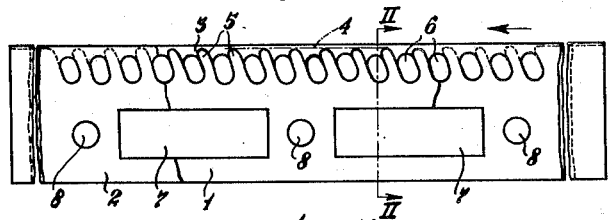
Fig. 1 is a plan view of a filter plate according to the invention, partially broken away, while at the same time a filter plate located directly at the rear thereof has been shown.
Figure 2:
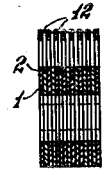
Fig. 2 is a cross-section on the line II—II in Fig. 1.

According to Figs. 1 and 2 each filter element consists of a stack of thin metal plates 1 and 2, each having a thickness of less than one mm., a series of recesses 3 being stamped out from the upper plate at the one longitudinal edge. Said recesses start at that edge which in the press is intended to form part of the filtering surface proper of the filter, composed of the elements 1 and 2. The recesses 3 are confined at the inlet end by planes or edges 5 receding with respect to the filtering surface 4 proper and having a rounded profile.

The plates 2 are along the filtering surface proper provided with holes 6 registering with the discharge ends of the recesses 3 in the plates 1. Further all of the plates of a stack have central apertures 7, all-round confined and three holes 8 for the passage of attachment bolts for joining together a large number, for instance some hundreds of plates 1 and 2, so as to form a filter. The registering holes 6 and recesses 3 constitute discharge passages in the filter. The central apertures 7 of the various plates 1 and 2 also coincide, whereby central chambers are formed.

Before placing the plates 1 and 2 against each other they may be covered with cement, that hardens, whereby at the same time the chambers, formed by the apertures 7, are tightened towards the exterior and may serve for the indirect heating of the filtering surface by means of a heating medium, such as steam, hot gases or liquids. A filter is thus obtained having filtering surfaces which are very strong, have a very large section of passage and are adapted to be indirectly heated. With passage-slots of e. g. 0.05 mm. and at a distance apart of 0.05 mm. a filtering capacity of 50% is obtained. The direction of the material is indicated by an arrow.

According to Fig. 3 use is made of filter plates, the sides or edges of which in the filter are intended to form part of the filtering surface proper are as regards adjacent filter plates arranged in staggered relation as in Fig. 1. A filter plate having straight edges 9 alternates with a filter plate having corrugated edges 10, the genetrix of the tops of the outwardly directed corrugations coinciding with the filtering surface proper. The plates, having the straight edges 9, as well as those, having the corrugated edges 10, are provided with recesses 51, widening in the direction away from said edges and starting in the corrugated plates at a point of the corrugated line located inwardly with respect to the edge 9. There is also a central aperture 7 while there are also bolt holes.

In a filter having filter elements according to Figs. 1 and 2 and according to Figs. 3 and 4 there are thus formed two systems of discharge passages, namely the vertical passages, which are formed by the registering openings 3 and 6 in Figs. 1 and 2 and the registering openings 11 in Figs. 3 and 4, and the passages which are parallel to the direction of motion of the material through the filter space and are more or less perpendicular to the first-mentioned passages, which are clearly shown in Figs. 1 and 2 and are denoted by 12 in Fig. 2. One can get a better idea of the passages in Figs. 3 and 4, which are parallel to the direction of motion of the material by conceiving the corrugated line as being straight and displaced inwardly with respect to the edges 7. In section a crenellated configuration of the filtering surface proper (see also Fig. 2) is then obtained, while by the reentering edges and the adjacent elements located at either side of a reentering element horizontal passages are formed, contributing to a very rapid removal of liquid. In Fig. 3 the bottom of said passages is formed by the corrugated filter-edge. The main direction of said passages, however, remains parallel to the direction of motion of the material through the filter space.

It appears from Fig. 4, that the edges 9 of the filter-elements in question in Fig. 3 are rounded off and at the same time that between these rounded off edges the above mentioned horizontal discharge passages are formed.

Figure 5:
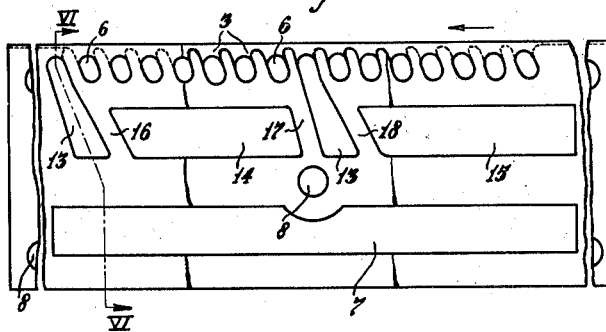
Fig. 5 is a plan view of a plurality of superposed filter elements for a vertical press, the uppermost being partially broken away.
Figure 6:
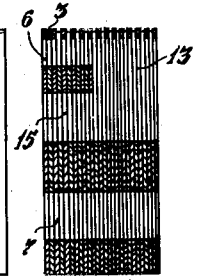
Fig. 6 is a section on the line VI—VI in Fig. 5, from which it appears that two groups of filter elements have been shown differing from one another groupwise.

In Figs. 5 and 6 filter plates are shown particularly adapted for use in a vertical filter press. As regards the marginal openings 3 and 6 there is in general similarity with the plates according to Figs. 1 and 2. In Figs. 5 and 6, however, the first and ninth marginal openings are lengthened by a recess 13 and further recesses 14 and 15 have been made which are separated by webs 16, 17, 18 from the extensions 13. A system of passages is thereby obtained which will be more fully explained with reference to Figs. 9 and 10. In the filter the spaces 13, 14, 15 form vertical discharge passages. The plates have further an aperture 7 which together with the registering corresponding apertures of the plates, combined in a stack, constitute a chamber for indirectly heating the filtering surface. There are also further bolt holes 8.

With reference to Figs. 9 and 10, it is remarked that by way of example a filter has been chosen composed of eight groups 19—26 of filter plates according to Figs. 5 and 6. The groups have been shown separately. In the first group 19 the uppermost marginal opening of the filter plates in question is extended rearwardly at 26′, and further the ninth at 27. In the second group the fifth marginal opening is extended at 28 and the thirteenth at 29, etc. It thus appears that all of the openings in the assembled position of the groups have a discharge, which is direct for the extended openings and indirect, through branch-passages, which are formed during assembling, for the other ones.

The system of passages appears more fully from Fig. 10. The hatched partition 26 corresponds to the extended opening 26′ in Fig. 9 in the group 19. The partition 27 in Fig. 10 corresponds to the opening 27 in Fig. 9, etc. The non-hatched partitions of group 19 correspond to the non-extended openings of the same group 19 in Fig. 9, etc.

The partition 30 of the first group 19 will communicate through the partition 31 of the group 20 with the extended opening, indicated by the hatched area 32 and connected to the discharge, etc. It appears also from Figs. 9 and 10 that by arranging the extended openings in the groups in staggered relation, a weakening of the filter, which would be caused by the registering of said openings, is avoided and that the webs provide for the required connection. The steam chambers are denoted by 33 in Fig. 9, the discharge passages by 34. The bolt holes have been omitted for the sake of simplicity.

In the horizontal filter press shown in Fig. 11 use is made of filters according to the invention, which filters are composed of filter plates, for example, according to Figs. 1 and 2. There are in this instance six filters 35 confining a hexahedronal filter space and enclosed within a frame 36. The steam chambers 37 of the filters are connected to a steam supply 38 while they are also in communication with a condensation water discharge 39. The pressed out liquid escapes at 40. Fitting surfaces 41 serve to clamp the filters in the correct hexagonal formation by means of pressure pieces 42, a strap 43 consisting of two halves and bolts 44. The side pieces 45 of the frame are also clamped together by bolts 46 arranged in such a manner that the filters may be passed between two adjacent bolts.

Figure 7:
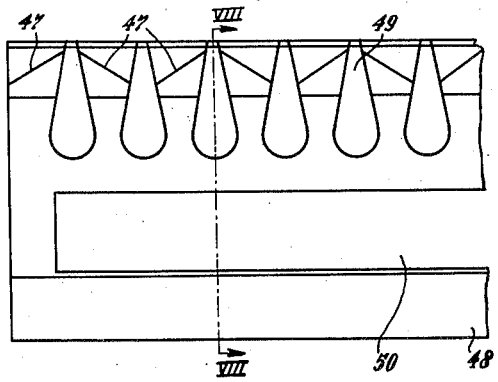
Figs. 7 and 8 show in plan view and in cross-section on the line VIII—VIII in Fig. 7 filter elements of other construction.
Figure 8:
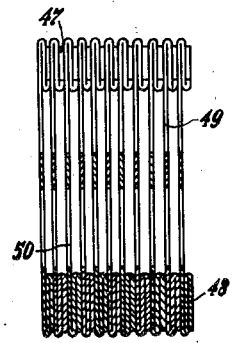

In Figs. 7 and 8 respectively a filter-element and a group thereof respectively is shown, in which by double folding and removal of material of the upper edge the desired rounded profile in accordance with Fig. 4 is obtained and moreover the passages extending in the direction of motion of the material to be pressed out are formed. By the cutting away of material the edges or surfaces 47 have been formed, corresponding to the receding filtering surfaces in Fig. 3. The lower edge 48 is also folded twice. This edge may be made thicker than the upper edge, so as to form thereby a cylindrical filter. For the rest the recesses 49 and the steam chamber 50 described already with reference to the preceding embodiments are applied again. The recesses 49 also constitute the liquid discharge passages in the direction of the thickness of the stack.

In Fig. 12 two superposed filter-elements are shown, the lower element being similar to the element 1 of Fig. 1, the adjacent or in this figure upper element 52, however, being of special construction. This element is also provided at the edge, which in the press is intended to form part of the filtering surface proper, with recesses, starting from said edge and with regard to the filter space extending outwardly. These marginal openings or recesses are denoted by 53. Between said recesses there are also portions 54, which in this embodiment have each a hole 55. The holes 55 register with holes in the element 1 in such a manner that at any time between two holes 55 registering with two corresponding holes in the element 1 there is a hole in the element 1, which is not covered by a filter element 52. The registering holes form continuous passages for a heating medium, such as steam or hot water.

The steam chambers which in Fig. 1 are formed by the registering apertures 7 may be omitted. It goes without saying that it is not necessary to have one hole in an element 1 between each pair of steam passages. There might be for instance also two holes in an element 1 between a pair of steam passages. Other embodiments are also conceivable without departing from the principle of the invention.

In the modification according to Fig. 13 the element 52 in Fig. 12 is replaced by a plurality of separate plates or strips 56, having holes 57 which, together with corresponding holes in the other elements, form steam passages. In this figure the strips 56 lie uppermost and the element that lies directly underneath is denoted by 58. This element may be substantially equal to the element 1 in Fig. 12. This embodiment is very suitable for use in a horizontal filter in particular with a view to the easy discharge through the passages 59.

In Fig. 12 as well as in Fig. 13 the marginal recesses taper away from the filter space. Another shape of the marginal recesses is, however, also possible.

I claim:

1. A drainage wall structure of an expressing press chamber, said wall structure comprising two types of filter plates, the first type having at the edge directed towards the press chamber a plurality of marginal incisions, the second type having a series of spaced holes, the plates of the first type alternating with the plates of the second type, the arrangement being such that the holes of the plates of the second type register with the inner discharge ends of corresponding incisions of the plates of the first type so as to form discharge passages extending in a direction at right angles to the axis of the press chamber.

2. A drainage wall structure according to claim 1, in which the edges directed toward the press chamber of the filter plates having incisions are offset with respect to the corresponding edges of the filter plates having the holes so as to form also discharge passages substantially parallel to the axis of the press chamber.

3. A drainage wall structure according to claim 1, in which the two types of filter plates are combined in single groups, all the groups having discontinuous discharge slots disposed longitudinally with respect to said edges at the rear of the incisions and holes, and each group of filter plates having different incisions extended rearwardly in between the adjacent ends of the discontinuous longitudinal discharge slots, the extended incisions of one group being bridged by discharge slots of an adjacent group.

4. A drainage wall structure according to claim 1, in which the edges directed toward the press chamber of the filter plates having incisions are offset with respect to the corresponding edges of the filter plates having the holes so as to form also discharge passages substantially parallel to the axis of the press chamber and in which the two types of filter plates are combined in single groups, all the groups having discontinuous discharge slots disposed longitudinally with respect to said edges at the rear of the incisions and holes, and each group of filter plates having different incisions extended rearwardly in between the adjacent ends of the discontinuous longitudinal discharge slots, the extended incisions of one group being bridged by discharge slots of an adjacent group.

ABRAHAM ten BOSCH, NJzn.